Dec. 26, 1961     R. E. MORGAN     3,015,039
FAIL-SAFE CONTROL APPARATUS
Original Filed June 25, 1957
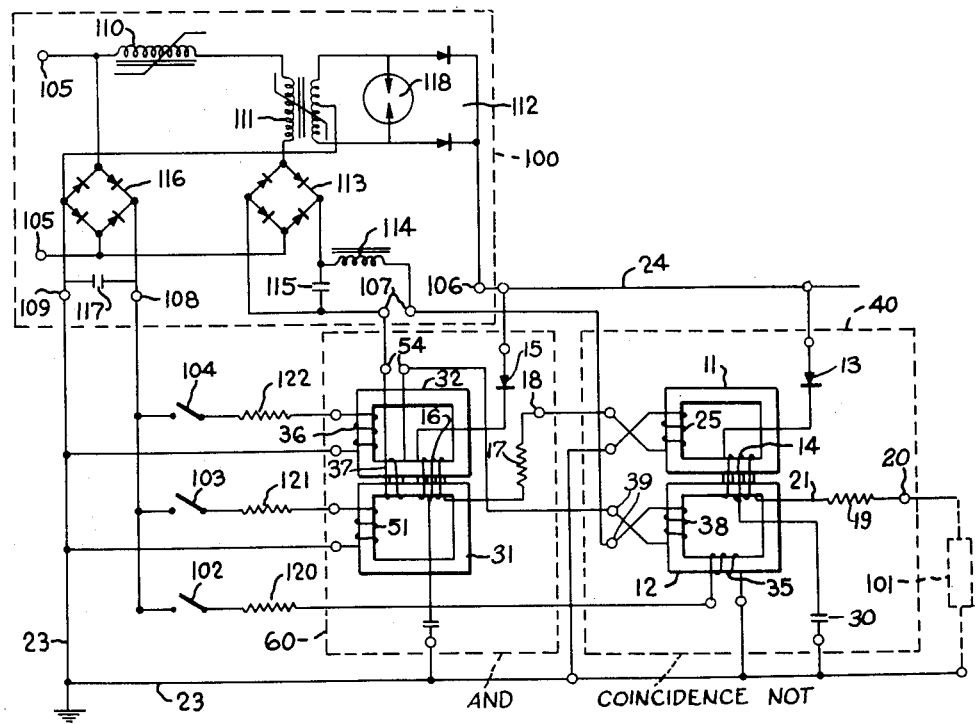
INVENTOR.
RAYMOND E. MORGAN
BY Martin Kalikow
ATTORNEY

3,015,039
FAIL-SAFE CONTROL APPARATUS
Raymond E. Morgan, Schenectady, N.Y., assignor to General Electric Company, a corporation of New York
Original application June 25, 1957, Ser. No. 667,945. Divided and this application Dec. 10, 1957, Ser. No. 701,811
7 Claims. (Cl. 307—88)

This invention relates to power supplying circuits for control apparatus, and more particularly to pulse power supplying circuits for use with static control units.

This application is a division of my co-pending application Serial No. 667,945, entitled Magnetic Control Apparatus, filed June 25, 1957, and assigned to the assignee of the present invention, now U.S. Patent No. 2,985,766.

Modern industrial tools and machinery such as punch presses, drill presses, lathes, etc., are now capable of performing many and varied shaping, cutting and forming operations substantially automatically. The control equipment for such tools and machinery is becoming evermore complex and expensive as manufacturing plants move toward more complete mechanization and "automation." Conventional magnetic relays, solenoids and limit switches employing separable contacts are well adapted for the control of machinery destined to perform relatively simple operations but are not adapted from the point of view of size, expense, reliability, and circuitry involved to control machinery destined to perform complicated and different operations in response to a variety of control signals and influences often in many different sequences.

In order to meet this need for more universal and reliable controls, control devices have been provided which do not utilize moving contacts and which are capable of statically switching electric currents or impulses in accord with basic logical or elemental control functions which make up the control systems. These "elemental control devices" have become known, for example, as "and," "or," "not," "memory," "delay" or "coincidence-not" units according to the particular control function which they perform. These control elements have taken the form of electronic units utilizing electronic amplifiers and electronic switching devices and also magnetic units utilizing magnetic amplifiers and contactless magnetic switching units. Some of these magnetic devices are described in a co-pending application Serial No. 630,936, in the name of R. A. Brown and entitled Static Control Unit With Feedback Winding and Capacitor, now U.S. Patent No. 2,985,766. The aforementioned application Serial No. 667,945 sets forth magnetic control apparatus including a "coincidence-not" unit which has no moving contacts and which is usable with the machinery applied in the complete mechanization and "automation" concepts of manufacturing.

The magnetic and electronic control units often require a special power supply because the power requirements are such as are not ordinarily available. It has been discovered that many of the electronic and magnetic control systems suffer from the deficiency that a failure in a component part will often lead to failure or even destruction of the entire control system. This occurs because the power supply unit which is utilized with the control system is unable to sense the proper operation of the control devices and therefore continues to supply power even though the device is improperly functioning. This continued supply of power may not only disrupt the control system but often leads to the failure or destruction of the component parts of the control system.

It is therefore an object of this invention to provide a power supply which will automatically turn itself off when a failure occurs in the control component which it supplies.

It is a further object of this invention to provide a simple and reliable power supply which is "fail-safe" insofar as and one of a number of control elements which it may supply.

It is a further object of this invention to provide a power supply capable of supplying pulse power to a load control element while being "fail-safe" in respect to failure of that control element.

In general, and in accord with the invention, a power supply is provided for energizing a main load circuit and a control circuit, the main load circuit being controlled by the operation of the control circuit, and means are provided between the control circuit and the power supply to deenergize the power supply upon a failure in the control circuit.

In accord with further features of the invention, a circuit is provided in which the power supply is adapted to supply a plurality of main load devices connected in parallel with the power supply each main load device having a control device associated therewith and connected to the power supply in a manner which renders the entire circuit inoperative upon failure of one of the auxiliary load devices.

The novel features believed characteristic of the invention are set forth in the appended claims. The invention itself, however, together with further objects and advantages thereof may be easily understood by referring to the following description taken in connection with the accompanying drawing in which the sole figure is a schematic circuit diagram which sets forth one embodiment of the invention in connection with a control system utilizing an "and" and a "coincidence-not" control unit.

Referring now to the circuit shown in the drawing I have shown a simplified control system utilizing the elemental control units of the aforementioned application Serial No. 667,945 with the present invention. A pulse power supply 100 supplies pulse power, bias current and original input current to an "and" unit 60 and a "coincidence-not" unit 40.

The term "pulse power" is used herein to mean a source of periodic pulses of electric voltage and current, each pulse having an abrupt rise and fall and having a much shorter duration than the duration of a half wave of sinusoidal current at 60 cycles. Preferably the ratio of pulse time to no pulse time during each cycle is considerably less than .1 and the voltage rise along the pulse wave front occurs during less than three degrees (3°) of a sinusoidal wave at 60 cycles. For example, square wave pulses of 400 microseconds duration at a repetition frequency of 120 pulses per second has been found to be excellent for the intended purpose.

The use of a pulse power supply to energize the magnetic control units of the invention not only permits a reduction in size and expense of the saturable reactor and its associated rectifier, and capacitor but also greatly improves the over-all operation of the units. It will be appreciated that in the particular control condition where one core 11 of the control unit 40 is saturated and the other core 12 is not. that the saturated core 11 provides an inductive load for the non-saturated core which is controlling the non-conduction of the gate winding 14. With a sinusoidal power supply this inductive load is much greater than that required with a pulse power supply for the load circuit 21 and the speed of response to a change in control signal is, therefore, much slower. With a pulse power supply the long period of time between power pulses is quite ample to permit discharge of the energy of this inductive load and reset of the controlling core to its no signal condition. In addition, with a pulse power supply the rectifier may have a lower peak inverse voltage rating compared to the required positive peak of voltage and the capacitor 30 may have less capacitance thereby permitting these components to be smaller and cheaper than when sinusoidal power supply is used.

The objective of the circuit shown in the drawing is to supply output current to a load impedance 101 whenever one input switch 102 is closed and either or both of two other switches 103, 104 remain open, but to turn off current to this load impedance 101 whenever switch 102 is open or all three switches 102, 103 and 104 are closed during the same time. Such a system is desirable, for example, where switch 102 is a master switch for controlling current to load impedance 101 and switches 103 and 104 are switches controlled by other circuits which are desired never to be closed simultaneously without turning off the current flowing through load impedance 101. Further description of the elements 40 and 60 and the detailed operational principles of these units can be found in the aforementioned application Serial No. 667,945 of which this application is a division.

The pulse power supply has a pair of input terminals 105 for receiving an alternating sinusoidal power frequency voltage, a pulse power output terminal 106, a pair of control current supplying output terminals 107 and an original signal current output terminal 108 and a common return terminal 109 for the signal current and pulse power outputs. A saturable reactor 110, a saturable energizing transformer 111 and a full wave rectifier 112 within power supply 100 convert the alternating sinusoidal voltage into a periodically recurring unidirectional pulse of power between terminals 106 and 109 at a frequency of 120 cycles per second (assuming a 60 cycle alternating current supply voltage). Another full wave rectifier 113 in series with the primary of transformer 111 together with another reactor 114 and capacitor 115 provide unidirectional substantially constant output current between terminals 107. Yet another full wave rectifier 116 connected directly across input terminals 105 together with the capacitor 117 provide unidirectional substantially constant output potential across terminals 108 and 109. A thyrite disk element 118 connected across the secondary of pulse transformer 111 serves to clip the peaks of the output pulses to a constant voltage amplitude.

The pulse power available across terminals 106 and 109 is connected to the gate or load circuit of both "and" unit 60 and "coincidence-not" unit 40 through power lines 23, 24. The current available at terminals 107 is connected to the signal receiving terminals 54 of "and" unit 60 and to the signal receiving terminals 39 of "coincidence-not" unit 40 in series circuit relationship. The windings 37 and 38 energized respectively from terminals 54 and 39 perform a control function commonly referred to as biasing and are hereafter referred to as bias windings. Because of this series circuit connection of the bias windings of the unit, any current flowing through the primary winding of pulse transformer 111 must also flow through these series connected bias windings. Consequently, any failure in the bias winding or in the bias circuit itself will also open or interrupt the circuit of current flowing to the pulse transformer and thereby extinguish the output power pulse. The system is thus "fail-safe" with respect to a failure in the bias current and can be made fail safe with respect to other control windings by similarly relating them to the power source.

Control winding 35 of "concidence-not" unit 40 and control windings 51 and 36 of "and" unit 60 are respectively connected in parallel with signal current terminals 108, 109 of power supply 100 through switches 102, 103 and 104 and current limiting resistors 120, 121 and 122 respectively. When the control unit 60 is actuated by the combination of signal currents in its control and bias windings 36, 37, and 51, an output current flows from power line 24 to power line 23 through the load circuit which comprises self-saturating rectifier 15, gate winding 16, current limiting resistor 17, output terminal 18 and control winding 25 of "coincidence-not" unit 40. It will be appreciated that the various control units may be connected in cascade in this manner by using the control winding of one unit as the load impedance for receiving the output loads of a preceding control unit. The load circuit 21 of control unit 40 is also connected across power lines 23 and 24 and includes the rectifier 13, gate winding 14, current limiting resistor 19, output terminal 20 and load impedance 101.

The "and" unit 60 and the "coincidence-not" unit 40 represent loads to the power amplifier and are connected in parallel across the output of the power supply between the terminal point 106 and ground. The bias winding 37 of "and" unit 60 and the bias winding 38 of "coincidence-not" unit 40 are series connected between the terminals 107 which places them in series with the primary winding of transformer 111.

In the operation of the circuit of FIGURE 1 with all switches 102, 103, 104 open so that no control signal voltages are supplied to control windings 36 and 51 of "and" unit 60 or to control winding 35 of "coincidence-not" unit 40, the magnetic cores 31 and 32 of "and" unit 60 are desaturated as a result of the bias winding flux, and the magnetic core 12 of the "coincidence-not" unit 40 is also desaturated as a result of the biasing flux of its bias winding 38. The magnetic core 11 of the "coincidence-not" unit 40, however, is in a saturated condition since there is no biasing flux or control winding flux in this core 11 and the core is driven into saturation by the gate winding flux. When switch 102 is closed, the magnetic core 12 of "coincidence-not" unit also becomes saturated as the result of the introduction of control flux from its control winding 35 with the result that the gate winding 14 snaps into a conducting state and delivers output current in load circuit 21 to load impedance 101. Whenever switch 102 is opened again, magnetic core 12 of "coincidence-not" unit 40 snaps into its unsaturated condition causing an interruption of current through gate winding 14 and load circuit 21.

Presuming switch 102 closed, however, the closure of switch 103 or of 104 alone will not suffice to interrupt current to load impedance 101. As either switch 103 or 104 is closed, either saturable core 31 or saturable core 32 of "and" unit 60 will become saturated as it receives the input signal voltage but no output signal current will flow to control winding 25 of "coincidence-not" unit 40 since one of the cores of the "and" unit 60 will still remain unsaturated. However if both switches 103 and 104 are closed and delivering signal voltages to both control windings 36, 51 of "and" unit 60 both cores 31 and 32 of this "and" unit 60 will be saturated and a load circuit current will flow to the control winding 25 of the "coincidence-not" unit 40 thereby desaturating the saturable core 11 of this "coincidence-not" unit and interrupting the output circuit current of the "coincidence-not" unit 40 to load impedance 101.

The "fail-safe" feature of this power supply is further understood when it is realized that no matter how many load control units (such as "and" unit 60 and "coincidence-not" unit 40) are utilized in parallel with the load supply, that each of the units has a bias winding connected in series circuit with the primary of the pulse power supply transformer. Thus, an open circuit developing in any one of the bias windings in each of the units will not only interrupt the bias current in that unit but will also interrupt the bias current in every unit and also open the primary circuit of the pulse transformer 111 thereby completely deenergizing the power supply. There is therefore no danger that some spurious control function will be performed because of the failure of a bias winding in one of the control units nor is there danger that the control units themselves or even the units which are being controlled will be mechanically damaged by virtue of the spurious control function.

A typical control circuit, such as is set forth in FIGURE 1, contains a power supply 100 having a saturable inductance 110 having a saturable magnetic core with 1,100 turn coil on this core. The saturable pulse transformer 111 consists of a saturable core with 275 primary turns and a center-tapped secondary winding with 146 turns wound thereon. The inductance 114 in the filter network has an inductance of .5 henry. The capacitor 115 in the filter network has a capacitance of 16 microfarads. The various rectifying elements in the bridge circuits 116 and 113 as well as the rectifying elements 112 in the output circuit of the secondary of the pulse transformer 111 can be germanium or silicon diode units. The thyrite disk element 118 is selected to provide the desired voltage amplitude.

The two load units for this power supply, "and" unit 60 and "coincidence-not" unit 40, can have the following specifications. For example, the magnetic cores each consist of a rectangular stack of laminations ⅛" thick and ⅜" wide. All of the gate, feedback and control windings are of #34 copper wire having a diameter of .0063" while the bias winding is of #28 copper wire having a diameter of .0126". Bias winding 37 has 8 turns, control windings 36 and 51 each have 500 turns, gate winding 14 has 900 turns. The self-saturating rectifiers may be in the form of a small germanium or silicon diode and capacitor 30 has a capacitance of 2 microfarads while resistor 19 has a resistance of 7,500 ohms. The power pulses supplied from the power supply 100 typically have an amplitude of 55 volts, a duration of 400 microseconds and a pulse repetition frequency of 120 pulses per second. A typical bias current is .44 ampere.

Although I have described my invention in connection with specific circuits and embodiments thereof many modifications may be made and it is to be understood therefore that I intend to cover all such modifications as fall within the true spirit and scope of the invention.

What I claim as new and desire to secure by Letters Patent of the United States is:

1. Magnetic control apparatus comprising a pulse power supply having an input circuit and an output circuit, a plurality of saturable reactor loads for said power supply, each said saturable reactor load having a gate winding and a bias winding, means connecting said gate windings in parallel with each other across the output circuit of said pulse power supply, and means connecting said bias windings in series circuit with each other and with the input circuit of said pulse power supply such that the energizing currents passing through the input circuit of said power supply pass also through said bias windings whereby said pulse power supply is deenergized upon occurrence of an open circuit failure in said series connected bias windings.

2. Magnetic control apparatus comprising a power supply having a transformer, said transformer having an energizing winding and an output winding, a plurality of saturable core devices each having a bias winding and a gate winding, means connecting said gate windings across said output winding, and means connecting said bias windings and said energizing winding in series such that energizing currents passing through said energizing winding pass also through said bias windings whereby said transformer is deenergized upon occurrence of a failure in any one of said bias windings.

3. The apparatus of claim 2 wherein said energizing transformer is a pulse transformer.

4. Fail-safe control apparatus comprising: a power supply including an input circuit and an output circuit; and saturable reactor control means including gate winding means connected in series with the output circuit of said power supply for connection in series with a load, control winding means for varying the effective impedance of said gate winding means, and a bias circuit for causing a characteristic mode of operation of said saturable reactor control means when an uninterrupted flow of current exists in said bias circuit, said bias circuit being connected in series with the input circuit of said power supply such that the energizing currents passing through the input circuit of said power supply pass also through said bias circuit, whereby any interruption in the continuity of said bias circuit tending to vary the said characteristic mode of operation of said control means causes a cessation in the power delivered by said power supply.

5. Fail-safe control apparatus comprising: a power supply including a power transformer having an input winding and an output winding for supplying power; and a plurality of saturable reactors having gate windings connected in parallel with each other and in series with the output winding of said power transformer for delivering power to load devices, each of said saturable reactors having a bias winding for causing a characteristic mode of operation of its associated saturable reactor when an uninterrupted flow of current exists in said bias windings, said bias windings being connected in series with each other and with the input winding of said power transformer such that the energizing currents passing through said input winding pass also through said bias windings, whereby any interruption in the continuity of said bias windings tending to vary the said characteristic mode of operation causes said power supply to be deenergized.

6. Fail-safe control apparatus comprising: a power supply including an input circuit and an output circuit; a saturable reactor control unit including saturable magnetic core means and a gate winding in inductive relationship with said core means; a load circuit including said gate winding and the output circuit of said power supply for connection across a load; at least one control winding in inductive relationship with said core means for controlling the impedance of said gate winding; and a bias circuit for causing a characteristic mode of operation of said control unit when an uninterrupted flow of current exists in said bias circuit, said bias circuit being connected in series with the input circuit of said power supply such that the energizing currents passing through the input circuit of said power supply pass also through said bias circuit, whereby an interruption in the continuity of said bias circuit tending to vary the said characteristic mode of operation causes a deenergization of said power supply.

7. Fail-safe control apparatus comprising: a power supply including a power transformer having an energizing winding and an output winding; a saturable reactor control unit including saturable magnetic core means and a gate winding in inductive relationship with said core means; a load circuit including said gate winding and the output winding of said power supply transformer for connection across a load; at least one control winding in inductive relationship with said core means for controlling the impedance of said gate winding; a bias winding in inductive relationship with said core means for causing a characteristic mode of operation of said control unit when an uninterrupted flow of current exists in said bias circuit, said bias winding being connected in series with the energizing winding of said power supply transformer such that the energizing currents passing through said energizing winding pass also through said bias winding whereby any interruption of the currents in said bias winding tending to vary the said characteristic mode of operation causes said power supply to be deenergized.

References Cited in the file of this patent

UNITED STATES PATENTS

| | | |
|---|---|---|
| 2,685,653 | Orr et al. | Aug. 3, 1954 |
| 2,745,908 | Cohen et al. | May 15, 1956 |
| 2,749,451 | Talambiras | June 5, 1956 |
| 2,780,771 | Lee | Feb. 5, 1957 |
| 2,798,170 | Carlisle | July 2, 1957 |
| 2,809,305 | Carlisle | Oct. 8, 1957 |